US007264145B2

(12) United States Patent
Lloyd et al.

(10) Patent No.: US 7,264,145 B2
(45) Date of Patent: Sep. 4, 2007

(54) BUS BICYCLE RACK HAVING A SPRING OPERATED WHEEL LOCK

(75) Inventors: Jeffrey M. Lloyd, Auburn Hills, MI (US); Wesley J. Blanchard, Troy, MI (US); H. Dieter Featherman, Macomb Township, MI (US); Michael Baker, Sterling Heights, MI (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 11/077,613

(22) Filed: Mar. 11, 2005

(65) Prior Publication Data

US 2005/0199670 A1 Sep. 15, 2005

Related U.S. Application Data

(63) Continuation of application No. 10/368,254, filed on Feb. 18, 2003, now Pat. No. 6,968,986.

(60) Provisional application No. 60/390,217, filed on Jun. 20, 2002, provisional application No. 60/357,463, filed on Feb. 15, 2002.

(51) Int. Cl.
 *B60R 11/00* (2006.01)
(52) U.S. Cl. .................. 224/507; 224/924; 224/537; 224/511; 224/504
(58) Field of Classification Search ............. 224/924, 224/507, 537, 525, 536
See application file for complete search history.

(56) References Cited

U.S. PATENT DOCUMENTS

| 1,280,141 | A | * | 10/1918 | Bonner | .................. | 414/499 |
|---|---|---|---|---|---|---|
| 3,355,028 | A | * | 11/1967 | Mork | ..................... | 211/21 |
| 3,861,533 | A | | 1/1975 | Radek | | |
| 4,126,228 | A | * | 11/1978 | Bala et al. | ................ | 211/5 |
| 4,392,572 | A | | 7/1983 | Bernard | | |
| 4,400,129 | A | * | 8/1983 | Eisenberg et al. | ........ | 414/462 |
| 4,524,893 | A | | 6/1985 | Cole | | |
| 4,804,120 | A | * | 2/1989 | Kraklio | ................. | 224/536 |
| 5,238,125 | A | | 8/1993 | Smith | | |
| 5,246,120 | A | | 9/1993 | Walker | | |
| D372,691 | S | * | 8/1996 | Eason | .................. | D12/115 |
| 5,692,659 | A | * | 12/1997 | Reeves | .................. | 224/536 |
| 5,833,074 | A | * | 11/1998 | Phillips | ................. | 211/21 |
| 5,984,111 | A | | 11/1999 | Pennella | | |
| 6,149,039 | A | * | 11/2000 | Englander | ............... | 224/310 |
| 6,968,986 | B1 | * | 11/2005 | Lloyd et al. | ............ | 224/507 |

FOREIGN PATENT DOCUMENTS

WO   WO96/22910   *   1/1996

* cited by examiner

*Primary Examiner*—Tri M. Mai
(74) *Attorney, Agent, or Firm*—Young Basile

(57) ABSTRACT

A bicycle rack is provided for connection to a vehicle, and especially a bus for the transport of a bicycle. The bicycle rack has a frame pivotally connected to a bracket which is connectable to a front of a bus. A pair of elongate cradles traverse the frame of the rack. Each elongate cradle is capable of receiving a bicycle. Each elongate cradle includes a rear wheel cradle and a front wheel cradle. The front wheel cradle has a spring operated wheel lock. The wheel lock includes a rotatable armature which overlays and holds the front tire of the bicycle in a locked position. The armature is actuated by the weight of the front wheel or by the manual activation of an adjacent handle.

18 Claims, 5 Drawing Sheets

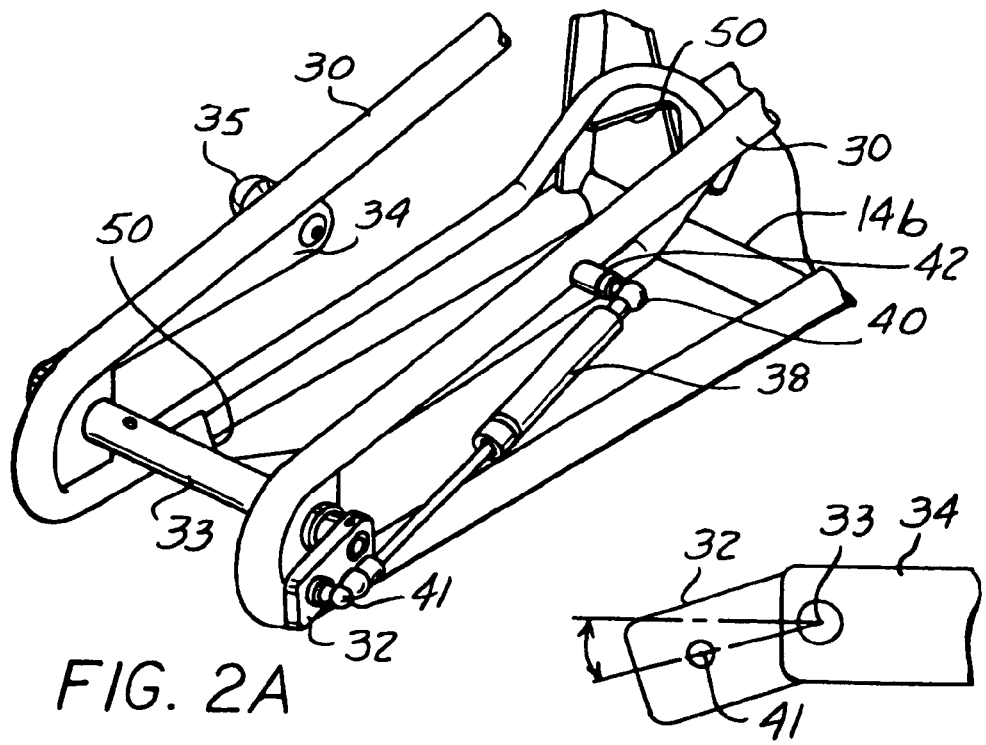
FIG. 2A
FIG. 2B
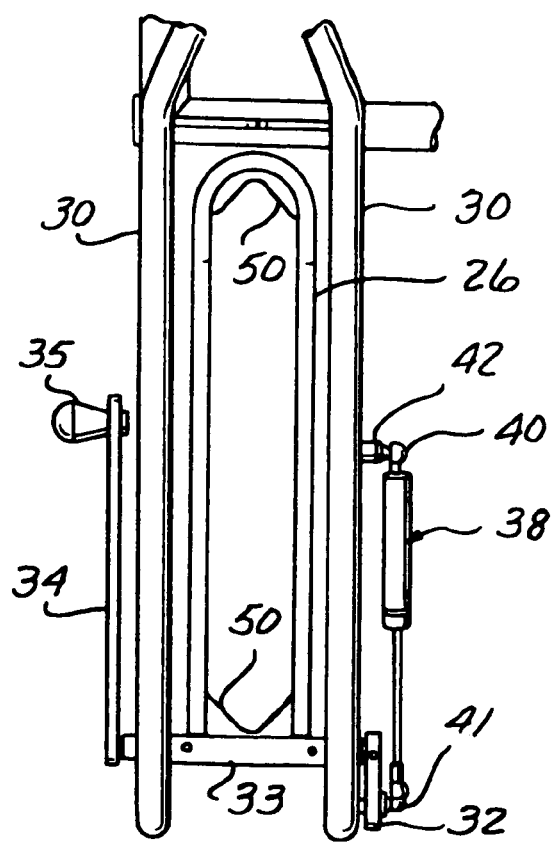
FIG. 3

BUS BICYCLE RACK HAVING A SPRING OPERATED WHEEL LOCK

This application claims priority from U.S. provisional patent application Ser. No. 60/357,463, filed Feb. 15, 2002, and U.S. provisional patent application Ser. No. 60/390,217, filed Jun. 20, 2002. This application is a continuation of patent application Ser. No. 10/368,254, U.S. Pat. No. 6,968,986, filed Feb. 18, 2003.

FIELD OF THE INVENTION

The invention relates to a bus bicycle rack having a spring operated wheel lock.

The use of bicycle racks is well-known in the art for securing bicycles to a vehicle for transporting the bicycle from one location to another. Conventional vehicle bicycle racks can be cumbersome to use requiring either tie downs or lockable clamps that require added work for the operator beyond merely placement of the bicycle within the rack.

Material used for tie-downs can deteriorate with exposure to the outdoor elements. In addition, the tie downs can get separated from the bicycle rack and thereby rendering the bicycle rack inoperable. Lockable clamps can also require multiple parts that can be separated from the bicycle rack. Further, lockable clamps can be difficult to engage while positioning and holding the bicycle in an upright position within the bicycle rack.

It is therefore desirable to provide a bicycle rack with few or no required components that can get separated from the rack. It is further desirable to provide a bicycle rack that is easy to receive and lock a bicycle therein. It is also desirable to provide a bicycle rack that allows for easy retrieval of the bicycle therefrom.

Other applications of the present invention will become apparent to those skilled in the art when the following description of the best mode contemplated for practicing the invention is read in conjunction with the accompanying drawings.

SUMMARY OF THE INVENTION

It is the intent of the invention to address the aforementioned concerns. In accordance with the present invention a carrier device for transporting a bicycle on a vehicle includes a bracket connectable to the vehicle and a frame having a pair of parallel spaced bars extending from the bracket. An elongate cradle is connected to and traverses the pair of parallel spaced bars. The cradle has a front wheel cradle at one end and a rear wheel cradle at an opposing end. The front wheel cradle has a front wheel mechanism for overlaying and holding an outer edge of the front wheel in a locked position to secure the bicycle in the elongate cradle.

In another aspect of the invention, the front wheel mechanism includes a spring loaded armature biased to be essentially parallel with the front wheel cradle. The armature holds the front wheel of the bicycle within the front wheel lock.

In yet another aspect of the invention, the front wheel mechanism includes a handle for manually actuating the armature.

In another aspect of the invention, the front wheel cradle includes a pair of parallel members spaced from each other for receiving a bottom portion of the front wheel of the bicycle therebetween and wherein the armature is movable with the weight of the front wheel when received in the front wheel cradle.

BRIEF DESCRIPTION OF THE DRAWINGS

The description herein makes reference to the accompanying drawings wherein like reference numerals refer to like parts throughout the several views, and wherein:

FIG. 2a is a perspective view of a portion of the front wheel cradle of FIG. 1 showing a spring mechanism for the wheel locking mechanism;

FIG. 2b is a schematic view of a portion of the spring mechanism;

FIG. 3 is an elevational bottom view of the wheel locking mechanism shown in FIG. 2a;

DESCRIPTION OF THE PREFERRED EMBODIMENT

Figure 1:
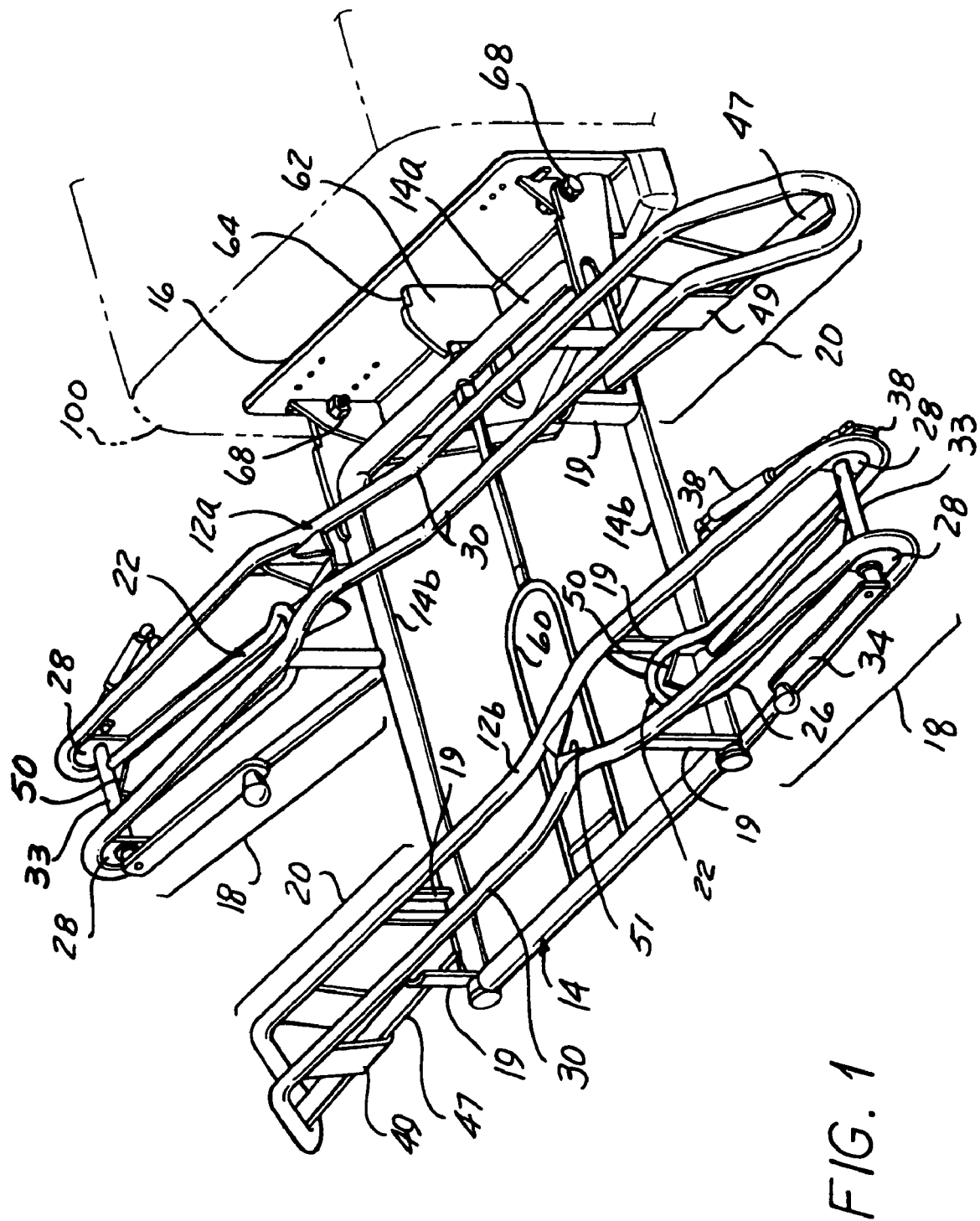
FIG. 1 is a perspective view of a bicycle rack of the present invention in the deployed position having a front wheel cradle with a wheel locking mechanism having a revolving armature in an unlocked position.

Referring to the figures, the bus bicycle rack 10 of the present invention includes a pair of elongate bicycle cradles 12a, b each formed by a pair of spaced and parallel rails 30 which extend continuously from the front of the bicycle to the rear of the bicycle when the bicycle is disposed in the bicycle rack 10. The parallel rails 30 forming the bicycle cradle 12a or 12b are connected to a frame 14 via risers 19 that raise the rails 30 over the frame 14. The frame 14 is pivotally connected to a bracket assembly 16 that can be bolted to a front of a bus.

The elongate bicycle cradles 12a, b are oriented so that bicycles locked within the cradles 12a, b will traverse the front of the bus 100. The bicycle cradles 12a, b are oriented on the frame 14 in opposite directions to prevent any interference from the handlebars of one bicycle with the handlebars of the second bicycle. Each bicycle cradle 12a, b has a front wheel cradle 18 and a rear wheel cradle 20 at opposing ends. The rear wheel cradle 20 defines a well for receiving the rear wheel of a bicycle. The rear wheel cradle 20 includes a rigid floor 47 with side bars 49 (FIG. 1) or a brace 46 (FIG. 6) for supporting the outer bottom periphery of the rear wheel of the bicycle below the rails 30 of the rear wheel cradle 20.

Figure 6:
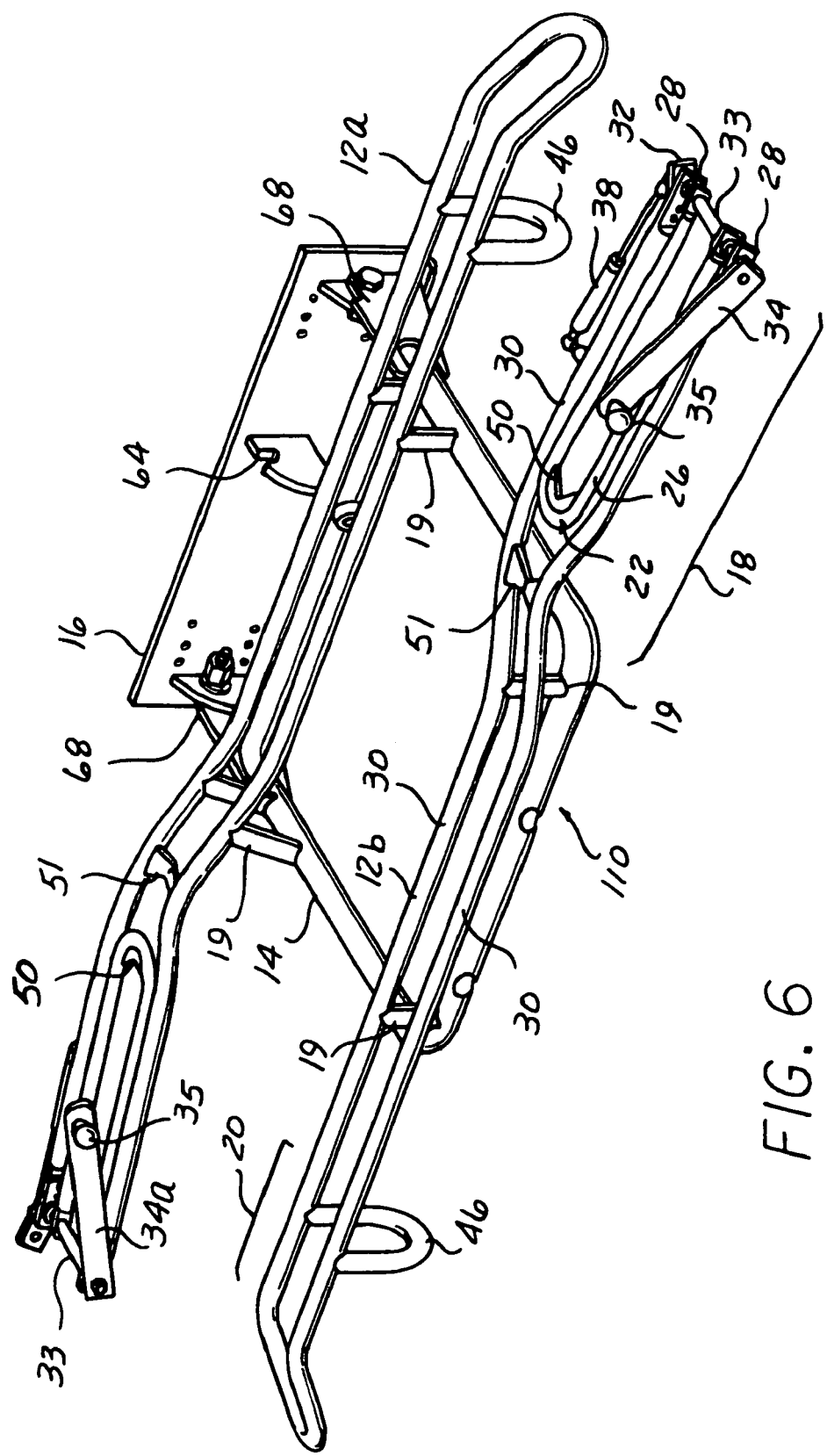
FIG. 6 is a perspective view of an alternative embodiment of the bicycle rack with a wheel locking mechanism.

The front wheel cradle 18 also defines a well for receiving the front wheel 24 of a bicycle. A portion of the frame 14b forms a support for the outer bottom periphery of the front wheel 24 of the bicycle. A spring-loaded front wheel locking mechanism 22 forms a support for the top of the front wheel as well as a lock to maintain the bicycle 100 within the bicycle cradle 12a or 12b. Each of the front wheel locking mechanisms 22 are identical and operate in the same manner. Therefore, only one front wheel locking mechanism 22 on one bicycle cradle 12b will be discussed. FIG. 1 shows one embodiment of the bus bicycle rack 10 with the wheel locking mechanism 22 in an unlocked position. FIG. 6 shows an alternative embodiment of the bicycle rack 10 with the wheel locking mechanism 22 in an unlocked position.

The front wheel mechanism 22 includes an armature 26 pivotally connected to a rotatable axle 33. The rotatable axle 33 is connected at its ends to brackets 28. The brackets 28 are attached to each side rail 30 of the bicycle cradle 12b at the front end of the front wheel cradle 18. A spring mechanism 38 communicates with the armature 26 via the rotatable axle 33. Looking at FIGS. 2 and 3, one end 41 of the spring mechanism 38 is connected to a hub or plate assembly 32 at one end of the rotatable axle 33. The plate assembly 32 is best shown in FIG. 2a. The connection of the end 41 of the spring mechanism 38 to the plate assembly 32 is offset by a predetermined distance from the pivotal connection of the plate assembly 32 to the rotatable axle 33 and a handle assembly 34. The offset connection facilitates the bias control of the spring mechanism 38 over the armature 26. The offset connection is schematically shown in FIG. 2b. When the armature 26 has been rotated a predetermined amount by either the force of the front wheel 24 of the bicycle or manually by the operator, the bias control on the armature 26 will force the armature 26 to continue the revolution, even after the force has been removed, to try to maintain the armature 26 assembly essentially parallel between the rails 30.

The opposing end 40 of the spring mechanism 38 is connected to another small bracket or spacer 42 which is connected to the adjacent rail 30. The spring mechanism 38 is preferably a gas operable spring mechanism, although other tension springs known in the art can be used. A rotatable handle assembly 34 is attached to the opposing end of the axle 33 from the spring mechanism 38. The rotatable handle assembly 34 rotates in unison with the axle 33. The handle assembly 34 may include a knob 35 to facilitate operation. Since, the rotatable handle assembly 34 rotates in unison with the axle 33, the handle assembly 34 and the armature 26 also move in unison. As a result, the operation of the wheel lock mechanism 22 may be actuated manually via the handle assembly 34.

The armature 26 has an open frame configuration for receiving a portion of the front wheel 24 therein. As stated supra, the armature 26 is pivotally connected to the axle 33 which is attached to the rails 30 via the brackets 28. In the unlocked position when no force is placed on the armature 26 as shown in FIGS. 1-3 and 6, the spring mechanism 38 biases the armature 26 to be located between the pair of rails 30 and oriented essentially parallel therebetween.

Figure 4:
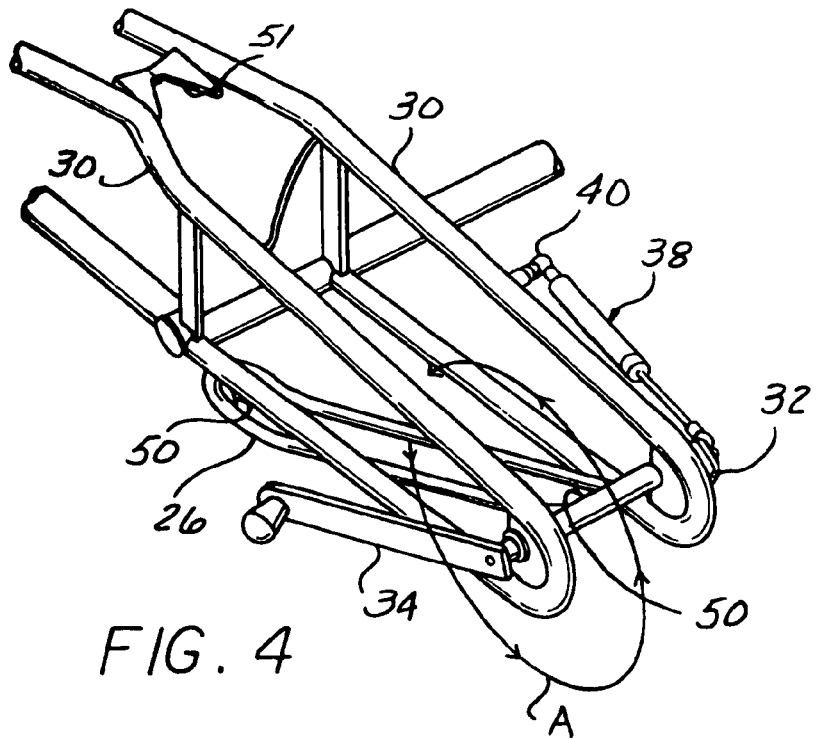
FIG. 4 is a perspective view of the front wheel cradle in FIG. 1 showing the movement of the armature on the bicycle rack.
Figure 5:
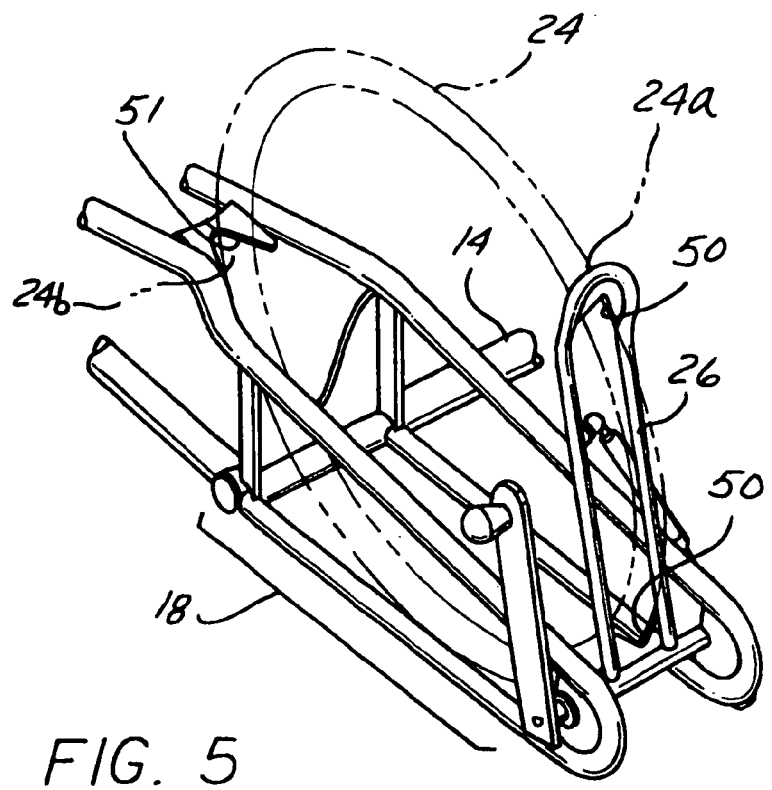
FIG. 5 is a perspective view of the front wheel cradle shown with a front wheel of a bicycle in a locked position.

As the front wheel 24 of a bicycle is placed within the front wheel cradle 18, the weight of the wheel 24 in the front wheel cradle forces the armature 26 to move downwardly and to rotate in the direction represented by the arrow "A" in FIG. 4. Because the spring mechanism 38 is biased to position the armature 26 as shown in FIG. 1, wherein the armature 26 is positioned essentially parallel and between the two rails 30, in order to lock the armature 26 over the front wheel 24 (as shown in FIG. 5), the handle assembly 34 can be manually turned in the direction "A" which further rotates the armature 26 in the "A" direction. At approximately the position where the armature 26 has rotated a predetermined rotational angle by either the weight of the wheel or by the manual movement of the handle assembly 34, the spring tension of the spring mechanism 38 takes over to continue the rotation of the armature 26 in the "A" direction so that the armature 26 is finally into the position as shown in FIG. 5. FIG. 5 shows the armature 26 resting under tension against the front wheel tire 24 to lock the front wheel within the front wheel cradle 18. The bias or tension force of the spring mechanism 38 is facilitated by the offset relationship of the hub or plate assembly 32 connection to the spring mechanism 38 versus the connection of the hub or plate assembly 32 to the axle 33 and handle assembly 34 connection. Although FIG. 4 shows the armature revolving in only one direction, the armature 26 may rotate either clockwise or counter clockwise. The direction of movement of the armature is based upon the weight of the bicycle wheel, the movement of the handle 34 and the position of the armature 26 when a pressure or force on the armature 26 is removed.

As can be seen in the figures and especially FIG. 5, the armature 26 has a wedge formation 50 at each end to limit the lateral movement of the front wheel 24. The wedge formation 50 holds an exterior front portion of the front wheel 24 within the front cradle 18. Between each pair of rails 30 and located at a predetermined location, a wedge-shaped member 51 is connected to the rails 30. The wedge-shaped member 51 provides to support for an exterior rear portion of the front wheel 24. The tension applied to the front wheel 24 by the armature 26, the wedge formation 50, and wedge-shaped member 51, together with a wheel well formed by the front wheel cradle 18 (shown in FIG. 5) for the lower portion of the front wheel 24, traps and secures the front wheel 24 in place within the bicycle rack 10.

When the front wheel 24 is locked in the front wheel cradle 18, the rear wheel (not shown) simply rests between the two rails 30 at the opposing end of the bicycle cradle 12b which defines the rear wheel cradle 20; and sets upon the brace 46 or floor 47. The depth of the rear wheel cradle 12b for the rear wheel is such that the rear wheel cannot bounce out of the near wheel cradle 12b.

The force applied by the armature 26 against the front wheel 24 at the wedge cutout 50 is approximately five to ten pounds. This amount of force prevents the front wheel 24 from jumping or bouncing out of the front wheel cradle 18 when traveling over rough or bumpy road surfaces. However, this amount of force still allows a person to easily remove the bicycle from the bicycle rack. The bicycle rack 10 of the present invention can accommodate various bicycle sizes.

When the bicycle is to be removed from the rack 10, the front wheel 24 can be easily lifted out of the front wheel cradle 18. Lifting the front wheel 24 from the front wheel cradle 18 will overcome the five to ten pound force placed on the front wheel 24 by the armature 26. As the front wheel 24 is lifted, the armature 26 reacts to the spring tension of the spring mechanism 38 and is forced to rotate in the direction "A" until it is again disposed between the two parallel rails 30. The spring operated wheel lock is now automatically in position for receiving another bicycle. The bicycle can also be removed by rotating the handle assembly 34 in the opposite direction of "A" to rotate the armature 26 away from the front wheel 24.

A bicycle rack 110 for lighter or smaller bicycles provides an alternative embodiment of the invention as shown in FIG. 6. In FIG. 6, the middle support brace assembly 60 which extends to the bracket 16 is eliminated. Further, the rear wheel cradle shows a U-shaped brace 46 rather than the rigid suspended bar or floor 47 as discussed supra.

Figure 7:
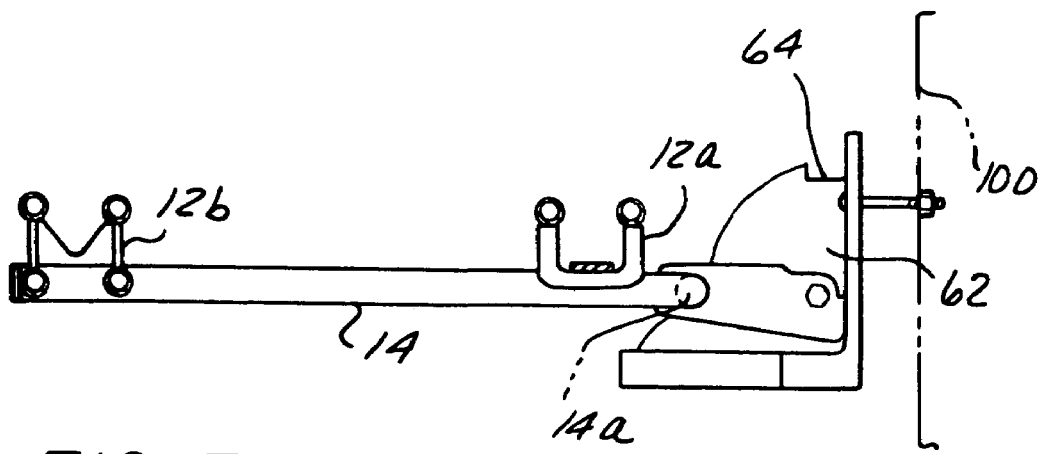
FIG. 7 is a schematic side view of the bicycle rack of the present invention in the deployed position.
Figure 8:
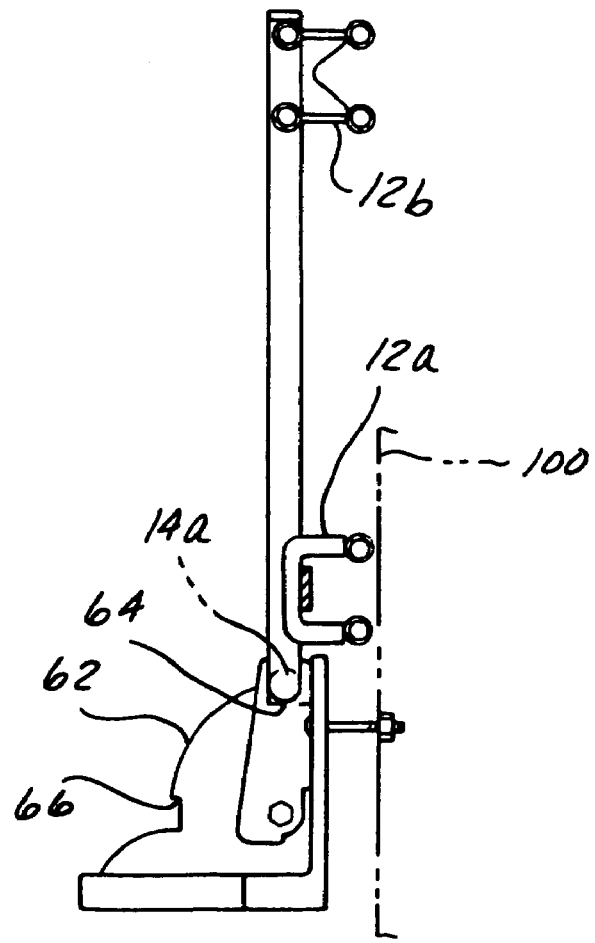
FIG. 8 is a schematic side view of the bicycle rack of the present invention in the retracted position.

FIGS. 1 and 6 show the bicycle racks 10 and 110 in the deployed position. When there are no bicycles to transport or carry within the racks, the bicycle racks 10 and 110 may be pivoted into a stowed or retracted position so that the frame 14 lays essentially parallel to the bracket 16 in the front of the bus 100. FIGS. 7 and 8 show schematic side views of the bicycle rack 10 in the deployed and retracted positions respectively. As can be seen in FIGS. 1 and 6-8, the bracket 16 has a member 62 centrally located and extending toward the rails 30. The member 62 has an upper notch 64 formed therein. The notch 64 is sized for receiving a portion of the frame 14*a* (shown in FIG. 1) located closest to the bracket 16. The upper notch 64 maintains the bicycle rack 10 in a retracted position when not in use. As can be seen in FIG. 8, the center member 62 also has a lower notch 66 for receiving the portion of the frame 14*a* when the bicycle rack 10 is in the deployed position. The lower notch 66 maintains the bicycle rack 10 in the deployed position when in use. The frame 14 pivots relative to the bracket 16 about pivot points 68.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A carrier for transporting a bicycle on a vehicle, the carrier comprising:
    a cradle engageable with a wheel of the bicycle, the cradle comprising a pair of elongated spaced apart parallel rails;
    an axle having one end rotatably connected to one of the spaced apart parallel rails and a second end rotatably connected to the opposite rail;
    a non-extensile locking arm for overlaying with tension an outer perimeter of the wheel, the locking arm disposed between the spaced apart rails and attached to the axle for enabling a full 360 degrees of unobstructed rotation of the locking arm about a longitudinal axis of the axle; and
    a biasing member having one end operable connected to the cradle and an opposite end operably connected to the locking arm for applying a torsional biasing force to the locking arm for releasably engaging the outer perimeter of the wheel with the axle.

2. The carrier of claim 1 further comprising a lever operably attached to the locking arm for concurrent rotation therewith about a common axis, the lever being attached to the biasing member, wherein the connection between the biasing member and the lever is displaced from the common axis of rotation.

3. The carrier of claim 2, wherein the biasing member includes a gas operable spring mechanism.

4. The carrier of claim 1, wherein the pair of spaced apart parallel rails define a front cradle operable for supporting a front wheel of the bicycle and a rear cradle operable for supporting a rear wheel of the bicycle, the two rails being disposed along opposite sides of the front and rear bicycle wheels when the bicycle is loaded onto the carrier.

5. The carrier of claim 1 further comprising an elongate support member suspended from at least one of the pair of spaced apart parallel rails, the support member engageable with the perimeter of the wheel of the bicycle for operably supporting the bicycle when loaded onto the carrier.

6. The carrier of claim 1 further comprising a U-shaped member having at least one end attached to at least one of the pair of spaced apart parallel rails, the U-shaped member engageable with the perimeter of the wheel of the bicycle for operably supporting the bicycle when loaded onto the carrier.

7. The carrier of claim 1, wherein the locking arm extends radially form the axle and has a U-shaped end portion cantilevered from the axle and engageable with the perimeter of the wheel of the bicycle.

8. The carrier of claim 7, wherein the U-shaped end portion of the locking arm defines a V-shaped notch engageable with the perimeter of the wheel.

9. The carrier of claim 1 further comprising a handle for manually actuating the locking arm, the handle operably connected to the locking arm for concurrent rotation therewith about a common axis of rotation, the handle being displaced from the locking arm and cantilevered from the common axis of rotation.

10. The carrier of claim 1, wherein the locking arm comprises a U-shaped portion engageable with the perimeter of the wheel, the U-shaped portion being cantilevered from an axis of rotation of the locking arm.

11. The carrier of claim 1, wherein the locking arm is biased to a substantially horizontal position.

12. The carrier of claim 1 further comprising a mounting bracket attached to the cradle, the mounting bracket having a hinge pivotally connecting the mounting bracket to the vehicle to enable the mounting bracket to be selectively positioned in a plurality of angular orientations relative to the vehicle.

13. The carrier of claim 12, wherein the mounting bracket is selectively moveable between an extended position, in which the mounting bracket extends horizontally from the vehicle, and a stored position, in which the mounting bracket is positioned vertically relative to the vehicle.

14. The carrier of claim 12 further comprising a latching mechanism for retaining the mounting bracket in at least one of the plurality of angular positions relative to the vehicle, the latching mechanism comprising a retaining member operably connected to the vehicle and having a recessed region, and a retractable pin operably associated with the mounting bracket, the pin being releaseably engageable with the recessed region of the retaining member.

15. The carrier of claim 14 further comprising a handle for selectively disengaging the pin from the recessed region of the retaining member, the handle having one end attached to the pin and a second end slidably connected to the mounting bracket.

16. A carrier for transporting a bicycle having a front and rear wheel on a vehicle, the device comprising:
    a bracket connectable to the vehicle;
    a frame having a pair of parallel and spaced bars extending from the bracket; and
    an elongate cradle connected to and traversing the pair of parallel and spaced bars, the cradle having a front wheel cradle at one end and a rear wheel cradle at an opposing end; the front wheel cradle comprising a pair of spaced apart rails and a front wheel mechanism for overlaying with tension an outer edge of the front wheel to lock the bicycle in the elongate cradle, the front wheel mechanism comprising an axle having one end rotatably connected to one of the rails and a second end rotatably connected to the opposite rail, and a nonextensile locking arm disposed between the spaced apart rails and attached to the axle for enabling a full 360 degrees of unobstructed rotation of the locking arm about a longitudinal axis of the axle.

17. The carrier device of claim 16, wherein the cradle has a wedge-shaped member for supporting a rear portion of the front wheel.

18. The carrier device of claim 13, further comprising means for pivoting the frame and longitudinal cradle relative to the bracket;

means for maintaining the frame and longitudinal cradle in a retracted position; and means for maintaining the frame and longitudinal cradle in a deployed position.

* * * * *

UNITED STATES PATENT AND TRADEMARK OFFICE
CERTIFICATE OF CORRECTION

PATENT NO.        : 7,264,145 B2  
APPLICATION NO. : 11/077613  
DATED             : September 4, 2007  
INVENTOR(S)       : Jeffrey M. Lloyd et al.

Page 1 of 1

It is certified that error appears in the above-identified patent and that said Letters Patent is hereby corrected as shown below:

In claim 1, column 5, line 41, delete "operable" and insert -- operably --, therefor.

In claim 12, column 6, line 26, delete "pivotally" and insert -- pivotably --, therefor.

In claim 18, column 7, line 4, delete "claim 13" and insert -- claim 16 --, therefor.

Signed and Sealed this

Thirtieth Day of June, 2009

JOHN DOLL
*Acting Director of the United States Patent and Trademark Office*